(12) United States Patent
Schwingenschlögel et al.

(10) Patent No.: US 7,651,166 B2
(45) Date of Patent: Jan. 26, 2010

(54) VEHICLE SEAT, IN PARTICULAR MOTOR VEHICLE SEAT

(75) Inventors: Stefan Schwingenschlögel, München (DE); Markus Petry, Grossniedesheim (DE)

(73) Assignees: Bayerische Motoren Werke Aktiengesellschaft, Munich (DE); Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/632,344

(22) PCT Filed: Nov. 9, 2005

(86) PCT No.: PCT/EP2005/011959

§ 371 (c)(1),
(2), (4) Date: Jul. 20, 2007

(87) PCT Pub. No.: WO2006/053657

PCT Pub. Date: May 26, 2006

(65) Prior Publication Data

US 2008/0030060 A1 Feb. 7, 2008

(30) Foreign Application Priority Data

Nov. 21, 2004 (DE) .................. 10 2004 057 471

(51) Int. Cl.
*B60N 2/02* (2006.01)
(52) U.S. Cl. .................. 297/378.12; 297/336; 297/334
(58) Field of Classification Search ................ 297/317, 297/321, 329, 334, 378.12, 336
See application file for complete search history.

(56) References Cited

U.S. PATENT DOCUMENTS 2,826,241 A * 3/1958 Himka .................. 297/341
3,311,405 A * 3/1967 Brennan et al. ............ 296/66

(Continued)

FOREIGN PATENT DOCUMENTS

DE 203 03 753 8/2004

(Continued)

OTHER PUBLICATIONS

International Search Report mailed Feb. 2, 2006 in corresponding International Application No. PCT/EP2005/011959.

(Continued)

*Primary Examiner*—David Dunn
*Assistant Examiner*—James Alex
(74) *Attorney, Agent, or Firm*—Davidson Berquist Jackson & Gowdey LLP

(57) ABSTRACT

In the case of a vehicle seat, in particular a motor vehicle seat, with a central structure, a seat cushion (219) which is carried by the central structure and has a seat cushion structure (218) and padding (220) at least partially resting on the seat cushion structure (218), and a backrest which can be pivoted relative to the central structure and/or to the seat cushion (219), the vehicle seat being transferable from a use position, in which it can be sat in, into a flat lowered position by pivoting of the backrest and lowering of the seat cushion (219), the padding (220) partially rests on a seat cushion support (241) which can be moved relative to the seat cushion structure (218) in order to transfer the vehicle seat into the lowered position.

17 Claims, 3 Drawing Sheets

U.S. PATENT DOCUMENTS

Figure 4:
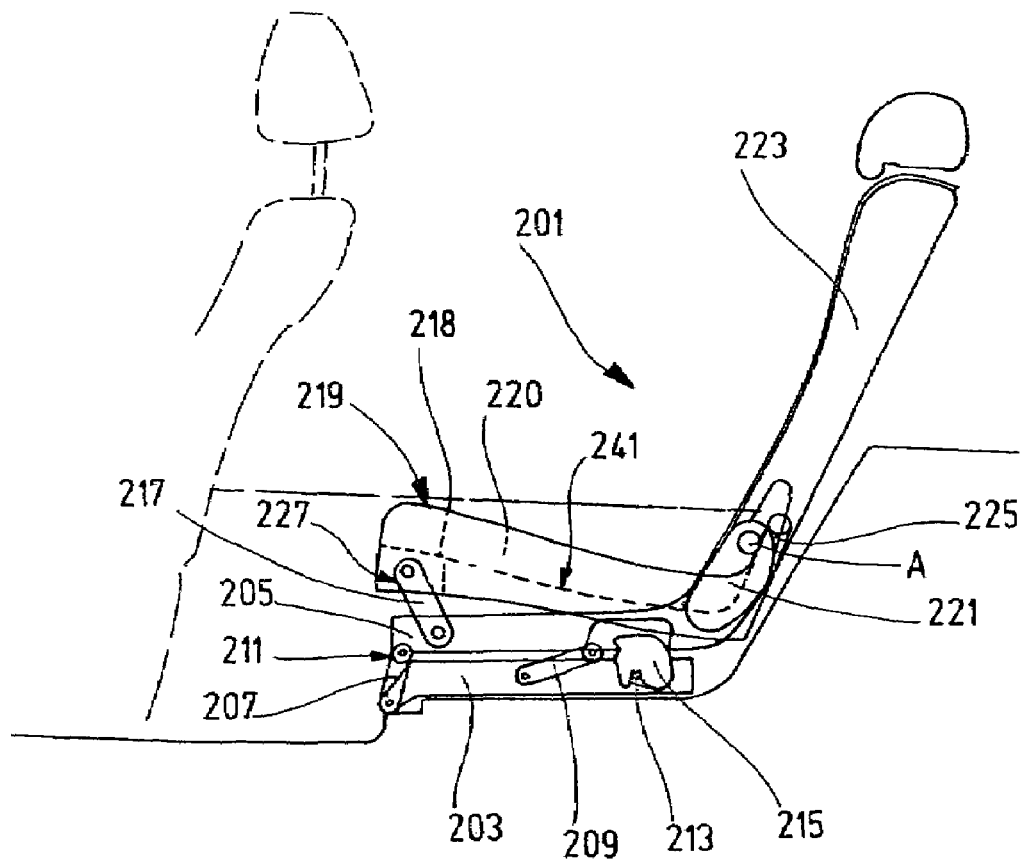

| | | | |
|---|---|---|---|
| 3,727,976 A * | 4/1973 | Lystad | 297/340 |
| 4,807,932 A * | 2/1989 | Hong | 297/344.14 |
| 4,840,427 A * | 6/1989 | Hong | 297/344.14 |
| 5,393,121 A * | 2/1995 | Reuss et al. | 297/329 |
| 5,397,167 A * | 3/1995 | Fourrey et al. | 297/354.13 |
| 5,454,624 A * | 10/1995 | Anglade et al. | 297/354.13 |
| 5,588,707 A * | 12/1996 | Bolsworth et al. | 297/378.12 |
| 5,733,005 A * | 3/1998 | Aufrere et al. | 297/340 |
| 5,979,985 A * | 11/1999 | Bauer et al. | 297/340 |
| 6,113,191 A * | 9/2000 | Seibold | 297/378.1 |
| 6,123,380 A | 9/2000 | Sturt et al. | |
| 6,601,900 B1 * | 8/2003 | Seibold | 296/65.09 |
| 6,964,452 B2 | 11/2005 | Kammerer | |
| 7,134,725 B2 * | 11/2006 | Hofmann et al. | 297/378.1 |
| 7,140,682 B2 * | 11/2006 | Jaeger et al. | 297/330 |
| 7,306,278 B2 * | 12/2007 | Holdampf | 296/65.09 |
| 2002/0125753 A1 * | 9/2002 | Kammerer | 297/331 |
| 2002/0171282 A1 | 11/2002 | Seibold et al. | |
| 2004/0056521 A1 * | 3/2004 | Kayumi et al. | 297/334 |

FOREIGN PATENT DOCUMENTS

| | | |
|---|---|---|
| DE | 10 2004 008 177 | 9/2004 |
| EP | 1 488 950 | 12/2004 |
| WO | WO 99/08894 | 2/1999 |
| WO | WO 2004/078515 | 9/2004 |

OTHER PUBLICATIONS

Patent Abstracts of Japan, Publication No. 2003118456, Publication Date: Apr. 23, 2003.

* cited by examiner

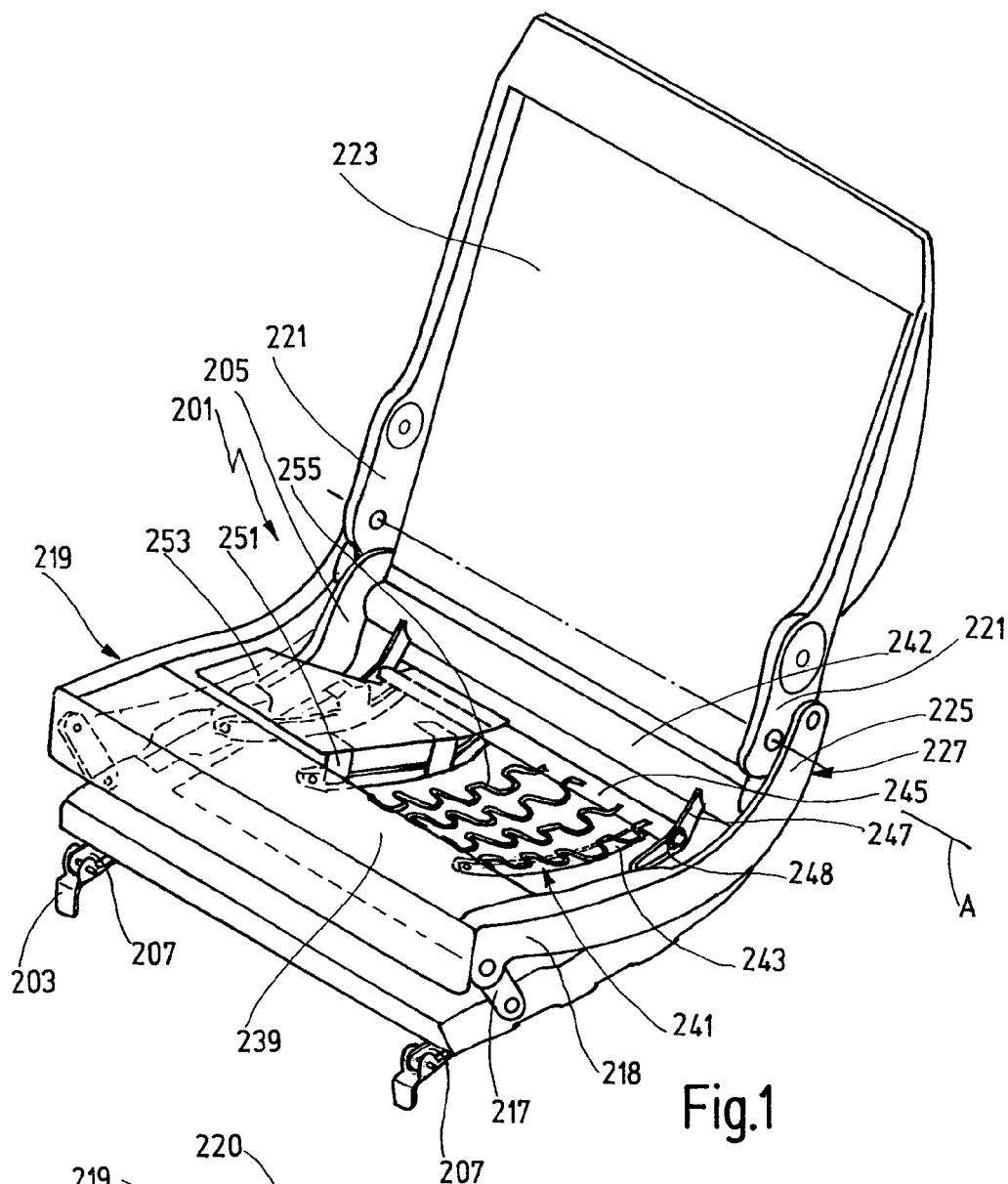
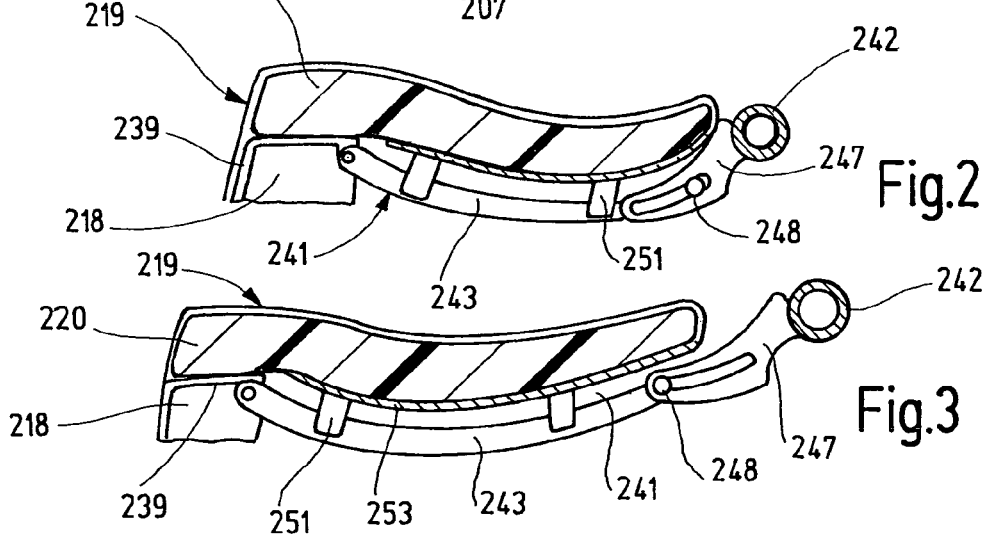

VEHICLE SEAT, IN PARTICULAR MOTOR VEHICLE SEAT

The invention relates to a vehicle seat, in particular a motor vehicle seat, with the features of the precharacterizing clause of claim 1.

A lowered position is understood as meaning a position of the vehicle seat in which at least the backrest is at least approximately folded forward into the horizontal and the seat cushion is preferably also lowered or folded away in order to provide storage space for the backrest.

In a known vehicle seat of the type mentioned at the beginning, the seat cushion is coupled to the central structure by means of a four-bar linkage. During the transfer into the lowered position, the four-bar linkage collapses, so that the seat cushion is placed against the central structure. On each side of the vehicle seat, the four-bar linkage is arranged as far to the outside as possible in order to have as much space as possible available in the center for the padding of the seat cushion. The padding rests, for example, on a rigid seat shell which extends beyond the center of the seat cushion.

The invention is based on the object of improving a vehicle seat of the type mentioned at the beginning. This object is achieved according to the invention by a vehicle seat with the features of claim 1. Advantageous refinements are the subject matter of the subclaims.

Owing to the fact that the padding rests partially on a seat cushion support which is movable relative to the seat cushion structure in order to transfer the vehicle seat into the lowered position, firstly the padding can be lowered better and further so that it can be better stored in the lowered position, resulting in the lowered position being flatter or, with the lowered position the same, a greater height of the padding is possible to improve the seat comfort. Secondly, the seat cushion, in particular the padding, is better supported—and can be coordinated with the use—to be precise preferably in the center where most of the occupant's weight is absorbed. The padding rests in a planar manner on the seat cushion structure and the seat cushion support.

The seat cushion support is preferably connected in an articulated manner to the seat cushion structure and to the central structure, which firstly ensures its mobility and secondly permits a direct introduction of force into the central structure with the seat cushion structure being bypassed. As an alternative to the preferred coupling on both sides, a coupling to the seat cushion structure or the central structure on one side can also be provided. For geometrical equalization, at least one turning and sliding joint is preferably provided at one end of the seat cushion support, which joint can be realized in a structurally simple manner by means of a slot and pin guide or another slotted guide mechanism. At the other end of the seat cushion support, a simple joint can be provided.

In a preferred, simple construction, the seat cushion support has at least one longitudinal member which is coupled at the front to the seat cushion structure, for example is coupled to a seat cushion crossbar by means of simple turning joints, and is connected at the rear to the central structure by means of the turning and sliding joints. However, the turning and sliding joints may also be provided at the front between seat cushion structure and longitudinal member. At least two longitudinal members are preferably provided which are connected to each other by means of a common transverse member in order to form a basic framework of the seat cushion support. The turning and sliding joints are then preferably assigned to the transverse member which, for example, in order to form the turning and sliding joints, is guided at its ends, for example of pin-like design, in guides of the central structure. However, it is also possible for guides in which pins or the like of the central structure engage to be fitted to the transverse member. For the preferred holding of the padding, a seat shell and/or a spring mat is provided between the longitudinal members and/or the transverse member and a seat cushion crossbar of the seat cushion structure.

A particularly deep lowered position can be achieved if the seat cushion is coupled to the central structure by means of a four-bar linkage, in particular by the seat cushion structure and the central structure forming two mechanism links of the four-bar linkage which, during the transition of the vehicle seat into the lowered position, lowers the seat cushion relative to the central structure, i.e. the height of the vehicle seat is additionally reduced by better utilization of the space. For example, one section of the backrest and a rocker form the two other mechanism links of the four-bar linkage.

Although the transfer into the lowered position is sufficient for a large number of applications, it is nevertheless advantageous if the vehicle seat can be transferred from the use position into an entry position. An entry position is to be understood as meaning a position of the vehicle seat in which at least the backrest is inclined in relation to the vertical forward (instead of rearward) in the direction of travel, preferably the entire vehicle seat is displaced forward. For this purpose, the central structure is preferably coupled to a substructure by means of a further four-bar linkage with the further four-bar linkage freely pivoting the vehicle seat as a whole while the backrest retains its position relative to the central structure. In a simplified embodiment of the vehicle seat without an entry position, the central structure can be connected fixedly to the substructure, with it being possible for the vehicle structure itself to act as the substructure.

Although the vehicle seat does not need to be longitudinally adjustable for the transfer into the lowered position, it is advantageous if the vehicle seat can be transferred into another longitudinal position of the seat in order to be able to set the longitudinal position of the seat individually to enhance comfort and in order, for example during the transfer into the entry position, to achieve a further forward displacement of the vehicle seat. The central structure then comprises, for example, two pairs of seat rails or has them or is coupled or attached fixedly to them.

Figure 5:
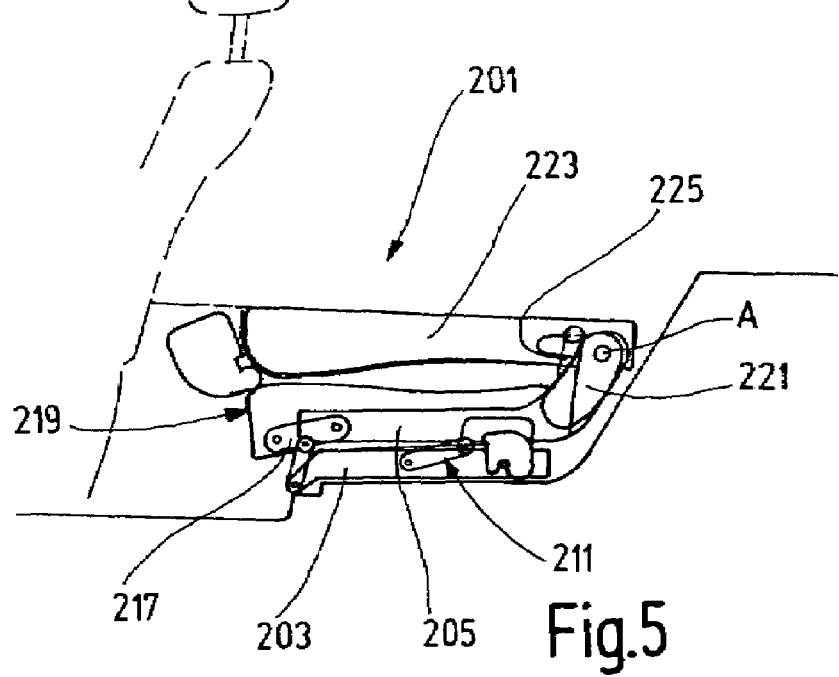
Figure 6:
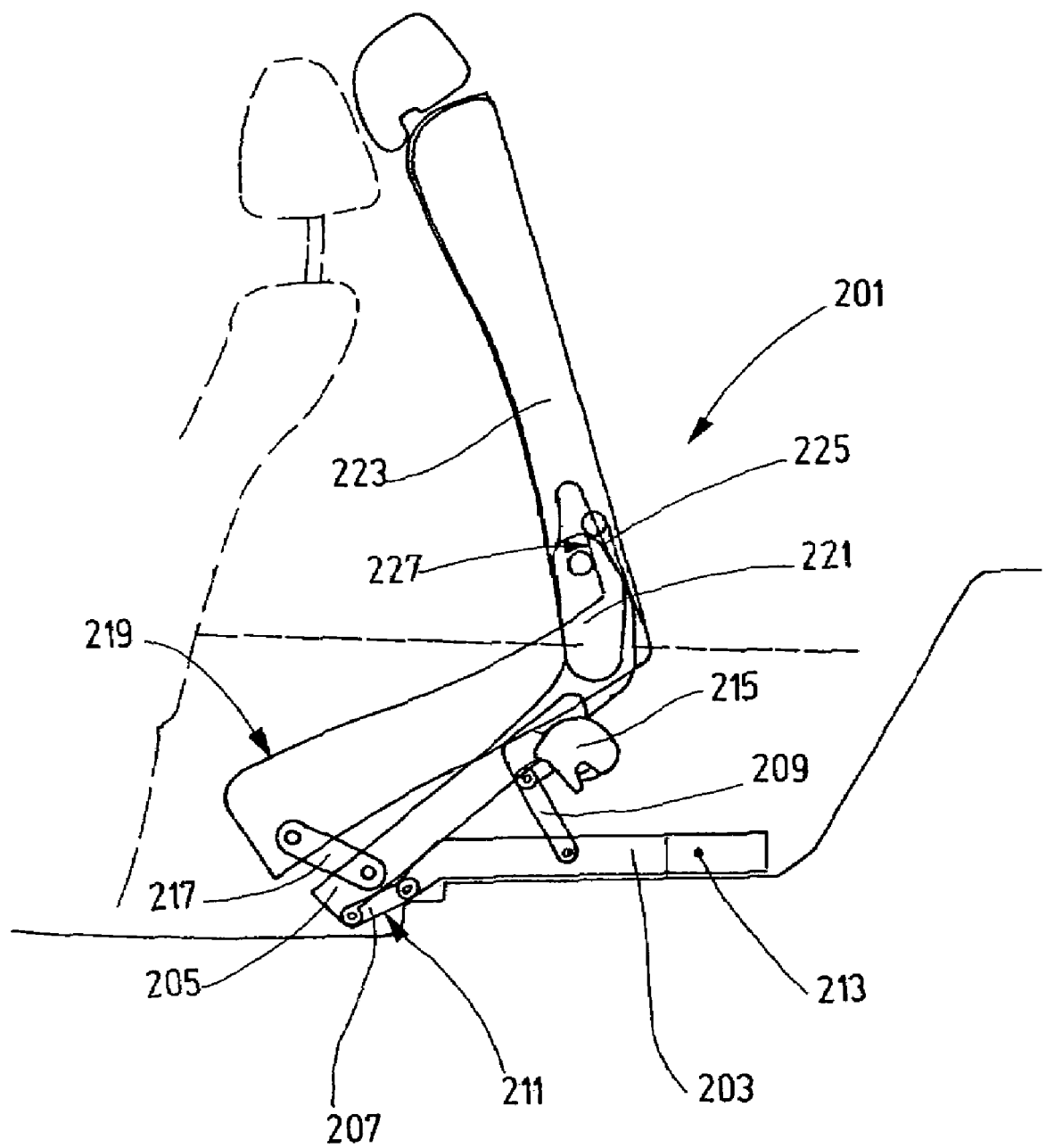

The invention is explained in more detail below with reference to an exemplary embodiment illustrated in the drawing, in which:

FIG. 1 shows a perspective partial view of the exemplary embodiment without padding in the use position, FIG. 2 shows a partial longitudinal section through the exemplary embodiment in the use position, FIG. 3 shows a view corresponding to FIG. 2 in the lowered position, FIG. 4 shows a schematic side view of the exemplary embodiment in the use position, FIG. 5 shows a view corresponding to FIG. 4 in the lowered position, and FIG. 6 shows a view corresponding to FIG. 4 in the entry position.

A vehicle seat 201 is provided for a rear seat row of a motor vehicle, in particular for the second seat row of a van. The arrangement of the vehicle seat 201 within the motor vehicle and the customary direction of travel thereof determine the directional details used below. The vehicle seat 201 has a substructure 203, which is connected to the vehicle structure or, in a modified embodiment, forms a part of the same, and a central structure 205 which, on each side of the vehicle seat, is coupled to the substructure 203 by means of a first rocker 207 at the front and by means of a second rocker 209 approximately in the center of the substructure 203 so that, on each side of the vehicle seat, the substructure 203, the two rockers 207 and 209 and the central structure 205 as mechanism elements define a first four-bar linkage 211. A bolt 213 is attached to the substructure 203 at the rear end on each side of the vehicle seat. A lock 215, which is attached to the central structure 205 at the rear end on each side of the vehicle seat, locks with the bolt 213 in a use position of the vehicle seat 201 that is suitable for a user to be seated in, as a result of which the first four-bar linkage 211 is locked.

At the front end of the central structure 205, a front corner of the seat cushion structure 218 of a seat cushion 219 is coupled by means of a third rocker 217 on each side of the vehicle seat. The term "seat cushion" is to be understood as meaning the entire subassembly with seat cushion structure 218 and padding 220. On each side of the vehicle seat, an inclination-adjustable fitting 221 is attached to the rear end of the central structure 205, the fitting in each case bearing one side of a backrest 223 and defining the pivot axis A of the backrest. The backrest 223 can therefore be pivoted and locked relative to the central structure in order to be able to set the inclination of the backrest individually to enhance the comfort. At the rear end of the seat cushion 219, an arm 225 which is fixed on the seat cushion structure is provided on each side of the vehicle seat, the arm being coupled to the backrest 223. In the present case, the arm 225 is formed integrally with the seat cushion structure 218. The third rocker 217, the seat cushion structure 218 together with arm 225, the backrest section between the coupling point of the arm 225 and the pivot axis of the backrest, and the central structure 205 define, as mechanism elements, a second four-bar linkage 227. The entire vehicle seat 201, in its construction described up to now, is essentially symmetrical to a vertical central plane, with the various coupling points on the two sides of the vehicle seat having axes which are aligned with one another.

Between two side parts of the seat cushion structure 218, which side parts are provided on each side of the vehicle seat, said seat cushion structure has, at the front, a seat cushion crossbar 239 which connects the two side parts of the seat cushion structure 218 fixedly to each other. The padding 220 rests in a planar manner at the front and laterally on the seat cushion structure 218 while it rests in its center in a planar manner on a special seat cushion support 241. The seat cushion support 241 is provided between the seat cushion crossbar 239 and the rear end of the central structure 205, in the present case a central structure crossbar 242 of the central structure 205.

The seat cushion support 241 has at least one longitudinal member 243, in the present case three longitudinal members which are parallel to one another, which are coupled at their front end to the seat cushion crossbar 239 by means of simple turning and sliding joints and are attached at their rear end to a transverse member 245. The transverse member 245 is guided in each case by its two ends of pin-shaped design in a slot in a slotted guide mechanism, referred to below as guide 247. This defines a respective turning and sliding joint 248. The two guides 247 which are parallel to each other are connected fixedly to the central structure 205, to be precise, in the present case, are fastened to the central structure crossbar 242 which connects two side parts of the central structure 205 fixedly to each other at their rear end. Alternatively, the guides 247 could, for example, be formed integrally with the side parts of the central structure 205 or be connected to the substructure 203.

There are a number of possibilities alternatively to one another or in combination with one another for supporting the padding 220 on the seat cushion support 241. In the present case, for one third of the width, a seat shell 253 which is slightly flexible is attached to two longitudinal members 243 by means of upwardly protruding adapters 251. For two thirds of the width, a spring mat 255 which has greater flexibility is attached between the seat cushion crossbar 239 and the transverse member 245.

To increase the loading volume, the vehicle seat 201 can be transferred into a flat lowered position. For this purpose, starting from a use position, preferably the design position, the backrest 223 is folded forward into a horizontal table position by means of the fitting 221, with, by means of a forced movement of the second four-bar linkage 227, in which the third rocker 217 folds forward, the seat cushion 219 being lowered forward and downward relative to the central structure 205. In the process, the seat cushion support 241 is pulled forward by the seat cushion crossbar 239 whereupon the transverse member 245 likewise follows forward in the guides 247. By means of a suitably selected profile of the slots in the guides 247, the seat cushion support 241 can move relative to the seat cushion 219. In particular, the seat cushion support 241 can be lowered further so that the backrest 223 can be better placed, i.e. with less pressing of the padding, onto the seat cushion 219. However, the relative stretching between that edge region of the padding 220 which is greatly supported by the side parts of the seat cushion structure 218 and that central region of the padding 220 which is supported by the seat cushion support 241 is compensated for by the padding 220 itself.

Furthermore, for better accessibility to the rear seat row, the vehicle seat 201 can be brought into an entry position. For this purpose, starting from a use position, preferably the design position, the vehicle seat 201 is first of all brought into the frontmost longitudinal position of the seat and then the lock 215 is opened, so that the lock 215 can be released from the bolt 213, and therefore the first four-bar linkage 211 is unlocked. By lowering of the first rocker 207 downward and pivoting of the second rocker 209 forward, the entire vehicle seat 201 is freely pivoted, in particular the central structure 205 which carries the backrest 223 is folded obliquely forward with the front edge of the central structure 205 pivoting forward and downward. A separate free pivoting of the backrest 223 is unnecessary. On the contrary, the latter retains its position relative to the central structure 205.

For a longitudinal adjustment of the vehicle seat 201, the substructure 203 or the central structure 205 is optionally provided laterally with pairs of seat rails which can be displaced relative to each other in the longitudinal direction and can be locked. By unlocking and displacing the seat rails relative to each other, the longitudinal position of the vehicle seat 201 can be adjusted, i.e. from a use position, for example the design position, the central structure 205, if appropriate also part of the substructure 203, is displaced together with seat cushion 219 and backrest 223 in the longitudinal direction, with the seat rails being locked again in the new use position.

LIST OF REFERENCE NUMBERS

201 Vehicle seat
203 Substructure
205 Central structure
207 First rocker
209 Second rocker
211 First four-bar linkage
213 Bolt
215 Lock 217 Third rocker
218 Seat cushion structure
219 Seat cushion
220 Padding
221 Fitting
223 Backrest
225 Arm
227 Second four-bar linkage
239 Seat cushion crossbar
241 Seat cushion support
242 Central structure crossbar
243 Longitudinal member
245 Transverse member
247 Guide
248 Turning and sliding joint
251 Adapter
253 Seat shell
255 Spring mat

The invention claimed is:

1. A vehicle seat, in particular a motor vehicle seat, comprising, a seat cushion which is carried by a central structure formed from a frame comprising front and rear crossbars and interconnecting side links, a seat cushion structure and padding at least partially resting on the seat cushion structure, the seat cushion structure comprising two side parts a rear end of each being coupled to a back rest and a front of each to opposite ends of a front support, front portion of the seat cushion structure being connected to the central structure by rockers and a rear portion thereof to the rear cross bar of the central structure by a seat cushion support assembly, the backrest being pivotally attached relative to the central structure and/or to the seat cushion, the vehicle seat being transferable from a use position, in which it can be sat in, into a flat lowered position by pivoting of the backrest and lowering of the seat cushion, wherein the padding partially rests on the seat cushion structure and partially on the seat cushion support assembly, wherein the seat cushion support assembly is connected at one end to the front support of the seat cushion structure and at an opposite end to a rear support bar and is movable relative to the seat cushion structure and relative to the central structure by a pivoting sliding joint assembly between the rear support bar of the seat cushion support assembly and the rear cross bar of the central structure in order to transfer the vehicle seat into the lowered position.

2. The vehicle seat as claimed in claim 1, wherein a central portion of the padding rests on the seat cushion support.

3. The vehicle seat as claimed in claim 1, wherein the seat cushion support is connected in an articulated manner to the seat cushion structure and to the central structure.

4. The vehicle seat as claimed in claim 3, Wherein the seat cushion support has at least one movable joint at one end thereof.

5. The vehicle seat as claimed in claim 4, wherein the seat cushion support has at least one longitudinal member movably coupled at a front end to the seat cushion structure and at a rear end to the central structure by the movable joint.

6. The vehicle seat as claimed in claim 5, wherein at least two longitudinal members are provided which are connected to each other by a common transverse member with the movable joint for each longitudinal member being attached to the transverse member.

7. The vehicle seat as claimed in claim 6, wherein in order to form the movable joints, the transverse member is guided at each of two ends in guides mounted to the central structure.

8. The vehicle seat as claimed in claim 6, wherein the padding and a seated user is supported by a seat shell and/or a spring mat positioned between the longitudinal members and/or between the transverse member and a seat cushion crossbar of the seat cushion structure.

9. A vehicle seat having a main frame, a seat cushion carried by the main frame, and a backrest which can be pivoted relative to the main frame and the seat cushion, the vehicle seat being transferable from an upright use position into a lowered position by pivoting of the backrest and moving the seat cushion, wherein the seat cushion is at least partially supported on a seat cushion support assembly and partially on a seat cushion structure, wherein the seat cushion support assembly is comprised of a structure having one end movably connected to a front support of the seat cushion structure and an opposite end connected to a rear support bar thereof, that is, in turn, connected to a rear crossbar of the main frame by a pivoting and sliding joint assembly so that the seat cushion support assembly is movable in forward and rearward directions relative the main frame along with the seat cushion structure, and relative to the front support of the seat cushion support assembly in a pivoting and sliding way to the rear crossbar of the main frame when the vehicle seat is transferred into the lowered position.

10. A vehicle seat, in particular motor vehicle seat, with a central structure, formed from a frame comprising front and rear crossbars and interconnecting side links, which is supported by a sub-structure onto the vehicle, a seat cushion which is carried by the central structure and has a seat cushion structure, the seat cushion structure comprising a front support and two opposed side parts coupled to a back rest with the seat cushion structure connected by rockers to the central structure and by a seat cushion support assembly to the rear cross bar of the central structure, the backrest being pivotally movable relative to the central structure and/or to the seat cushion, the vehicle seat being transferable from a use position, in which it can be sat in, into a flat lowered position by pivoting of the backrest and lowering of the seat cushion through a pivoting and sliding joint assembly, wherein the seat cushion partially rests on the seat cushion structure and partially on a seat cushion support assembly, the seat cushion support assembly being comprised of a structure having one end movably connected to the front support of the of the seat cushion structure and an opposite end connected to a rear support bar thereof that is, in turn, connected to the rear crossbar by the pivoting and sliding joint assembly so that the seat cushion support assembly is movable along with the seat cushion structure and relative to the front support of the seat cushion support assembly and in a pivoting and sliding way to the rear crossbar of the central structure in order to transfer the vehicle seat into the lowered position.

11. The vehicle seat as claimed in claim 10, wherein a central portion of the padding rests on the seat cushion support.

12. The vehicle seat as claimed in claim 10, wherein the seat cushion support is connected in an articulated manner to the seat cushion structure and to the central structure.

13. The vehicle seat as claimed in claim 12, wherein the pivoting and sliding joint assembly is located within the seat cushion support and at one end thereof.

14. The vehicle seat as claimed in claim 13, wherein the seat cushion support has at least a first longitudinal member movably coupled at a front end to the seat cushion structure and at a rear end to the central structure by the pivoting and sliding joint assembly.

15. The vehicle seat as claimed in claim 14, wherein the seat cushion support further includes at least two additional longitudinal members each being connected to a common transverse member which is, in turn, connected to a second transverse member located at the rear of the central structure by the pivoting and sliding joint assembly.

16. The vehicle seat as claimed in claim 15, wherein, the common transverse member is supported at each of two ends by the pivoting and sliding joint assembly.

17. The vehicle seat as claimed in claim 15, wherein the padding and a seated user is supported by a seat shell and/or a spring mat positioned between the at least two additional longitudinal members and connected between the common transverse member and a seat cushion crossbar of the seat cushion structure.

* * * * *